May 5, 1953
F. S. GIBBS
2,637,737
RECOVERY OF FATTY ACID VALVES FROM AQUEOUS
LIQUIDS CONTAINING SUCH VALVES
Filed March 19, 1949
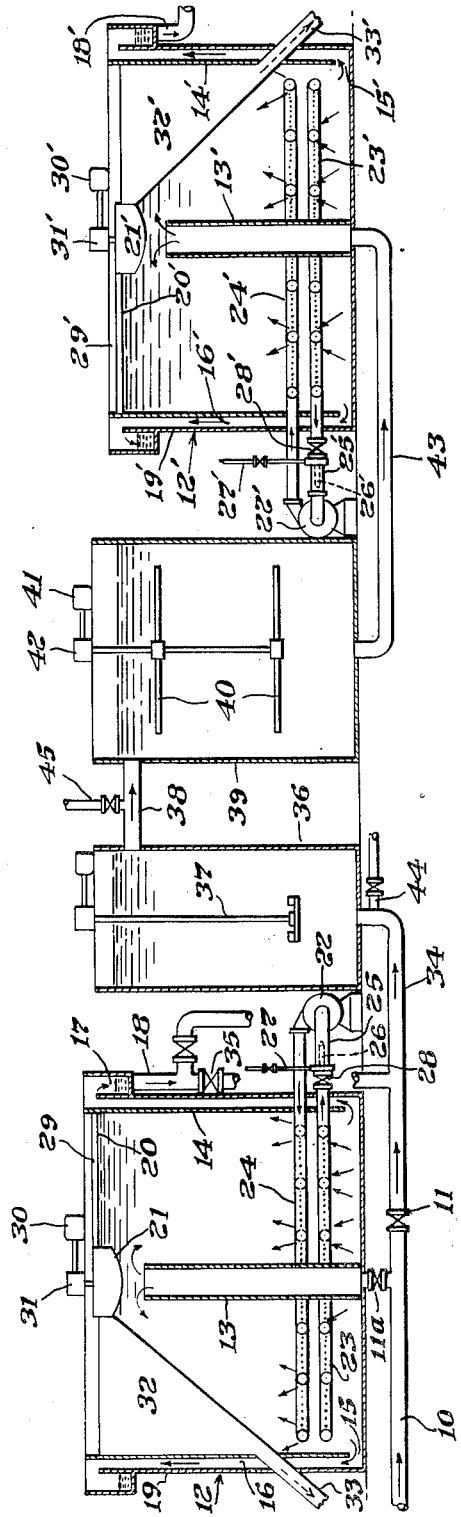
INVENTOR.
Fred S. Gibbs
BY H. S. Kirkpatrick.
ATTORNEY Patented May 5, 1953

2,637,737

UNITED STATES PATENT OFFICE 2,637,737

RECOVERY OF FATTY ACID VALUES FROM AQUEOUS LIQUIDS CONTAINING SUCH VALUES

Fred S. Gibbs, Waban, Mass., assignor to F. S. Gibbs, Inc., Boston, Mass., a corporation of Massachusetts Application March 19, 1949, Serial No. 82,332

18 Claims. (Cl. 260—412.5)

My invention relates to the recovery of fatty acid values from aqueous liquids containing such values. The invention is considered particularly valuable as applied to the treatment of waste liquors from soap manufacturing plants and similar establishments, but may be otherwise applied.

In soap plants, it is customary to employ contact condensers following the fatty acid flash tanks and to back up the main surface condensers following the fatty acid stills. The mixture of cooling water and condensed vapors thus formed represents a disposal problem which has challenged the best minds of the industry. When this liquor is discharged as waste into an adjacent body of water, as a fresh water stream or sea water, if proximate, the contained fatty acids tend to agglomerate into large chunks which constitute a serious nuisance as they are frequently washed up and deposited on swimming beaches and harbor installations, for example. Moreover, the contained acids tend to combine with the calcium salts found in fresh waters and with magnesium salts present in salt water to form insoluble soaps which are equally noisome.

Apart from the nuisance aspect, the material loss which occurs from discharge of the condensate to waste has greatly disturbed the industry. In the case of a large plant this loss may amount to several thousand dollars per month.

Several schemes, of course, have been heretofore proposed as solutions to the problem, but none has been generally adopted, a fact evidencing their impracticality or ineffectiveness. Most plants have resorted to the simple expedient of traps positioned in the lines through which the condensate is discharged. The efficiency of these traps is generally less than 50%.

My invention has as a principal object to provide a practical and economical process for the treatment of such liquids which allows for the recovery of substantially all of the contained fatty acid responsible for the nuisance problem. A further object is to provide a process which may be generally utilized in the recovery of fatty acid values from liquids containing such values. My invention embraces a system of apparatus which I have found suitable for use in the practice of the process.

In a liquid treated according to the invention, the fatty acid may be present free or combined and in several different physical states. A typical liquid may contain, for example, fatty acid soap, free unemulsified high molecular weight fatty acid, hereinafter referred to as "flotatable" acid and emulsified fatty acid. Soluble or filtrable fatty acid may also be present, but this form is not a source of nuisance and is not recoverable by means of my invention.

In accordance with my invention as applied to a liquid as just described, I first pass the liquid through a flotation system wherein the soap particles and high molecular weight acid are elevated to the surface of the liquid by minute gas bubbles charged to the liquid and are continuously removed from the surface. The liquid is then passed through a first agitator in which it is agitated to induce conversion of the emulsified acid to soap either by reaction with calcium and/or magnesium salts present as natural ingredients of the water component of the liquid or with added soap-forming chemical, as lime, for example. The effluent of the first agitator is received by a second agitator or flocculator in which the liquid is subjected to relatively gentle agitation to agglomerate the soap particles which are subsequently separated in a second flotation system which may conform with the first.

The fatty acid content of a liquid treated according to my invention may range from about 200 parts per million to 10,000 parts per million. More highly concentrated liquids may be treated after dilution with additional water. Dilution may also be employed to lower the temperature of the liquid as is frequently advantageous to reduce the solubility of the contained acids. I prefer that the temperature of the liquid lie within the range 60° F. to 175° F.

In some instances, particularly when the content of soap and/or flotatable acid is low, the first flotation system may be dispensed with and the liquid run directly into the first agitator with or without added soap-forming chemical, depending on the degree of hardness of the water component. If the mineral salt content of the water component is substantial but less than required to convert all of the emulsified acid to soap, it is my usual practice to add the necessary soap-forming chemical immediately before or during the flocculation treatment. This is also my usual practice in the case of the double stage flotation when the mineral salt content of the water introduced into the first agitator is as stated.

It is to be understood that my invention, as utilized in the soap industry, is nowise restricted to the particular liquids which have been indicated. Thus it may be employed, with advantage, to the treatment of the overhead product obtained on the purification of by-product glycerol by distillation. Such product consists principally of water, the pH of which is relatively very low, and dissolved and emulsified fatty acids. I may treat this liquid by either single or double stage flotation. Following the single stage procedure, I add lime or other suitable alkaline material to the liquid as it is fed into the first agitator in an amount sufficient to convert all of the contained acid to soap. The liquid is then subjected to the dual agitation treatment and passed through the flotation system, the agglomerated soap being recovered as a surface scum in the usual way. Following the two-stage procedure, as is advisable when the flotatable acid content of the emulsified condensate is high, the condensate, before introduction into the first flotation vessel, is first treated with a suitable emulsion breaker to free the flotatable acid. For this purpose I ordinarily use sodium or calcium chloride. No perceptible amount of soap is formed with either of these reagents, their effect being purely physical. Most of the freed acid is recovered in the first flotation vessel. On leaving such vessel, the liquid is treated with the proper amount of soap-forming chemical and further processed as just described.

Still other sources of fatty acid waste found about soap plants and similar establishments are traps, sealing glands, stuffing box drains, and overflow lines from stills and storage tanks. Loss from these sources does not compare with the loss from the sources above noted, but is nevertheless considerable over a period of months.

I shall further describe my invention with the aid of the accompanying drawing illustrating in essentially diagrammatic fashion a system of apparatus suitable for its practice. The single figure is a sectional elevational view through the several units making up the system.

The liquid being worked, which will be assumed to be salt water containing soap and free flotatable acid as well as emulsified acid, enters the system through line 10. Valve 11 being closed and valve 11a being open, the liquid passes into a first flotation unit 12 comprising an elongated cylindrical inner tank 13 and a concentric outer tank 14 of much greater diameter. The liquid flows upwardly through the inner tank 13, thence downwardly through the annular space between the walls of the two tanks, thence through apertures or ports 15 spaced around the outer tank wall at the bottom thereof, thence again upwardly through an annular weir chamber 16 into an annular collection chamber 17 from which the liquid is withdrawn via a conduit 18. The annular weir 19 should be made adjustable to allow for variation of the liquid level 20 in the tank 14. A baffle 21, which may be made cone-shaped, if desired, instead of bowl-shaped, as shown, forms a barrier between the surface of the liquid and the rim of the inner tank 13.

At the bottom of the annular space between the walls of tanks 13 and 14 and surrounding the inner tank are two sets of concentric apertured rings, each connecting with a pump 22, the lower set 23 being connected to the suction side of the pump, the upper set 24 to the delivery side. The rings in each set are interconnected by short sections of pipe, not shown.

In the suction line of the pump is an assembly 25, including a porous tube 26 connecting with a valve-controlled air line 27 opening to the atmosphere. Such an assembly is described in detail in my copending application, Serial No. 212,312, filed February 23, 1951, and for that reason needs to be only generally referred to here. Suffice it to say, that when the valve in line 27 is open, air is drawn through the porous tube 26 into the liquid enveloping the tube. Depending upon the quantity of air it is desired to introduce into the liquid, valve 28 may or may not be throttled to increase the negative head.

The fine pinpoint-size air bubbles thus produced are carried by the liquid through the pump and are discharged with the liquid through the apertures in the upper set of concentric rings 24. As the bubbles pass upwardly against the downwardly flowing liquid they become entrapped in the contained non-emulsified insolubles with the result that these are elevated to the surface of the liquid where they form a scum. This scum is continuously removed by means shown as consisting of a slowly revolving flexible skimmer blade 29, powered by motor 30 through reduction gearing 31. Blade 29 feeds a collection trough 32 terminating in a discharge pipe 33. A trough similar to trough 32 is described in detail in my copending application previously identified. The trough is so constructed that its edges at the surface of the liquid are on true radial lines, the opening or slot over which the skimmer blade passes thus being wedge-shaped. In the preferred construction, the edge of the trough first contacted by the blade is equipped with a downwardly inclined lip extending in the path of advancement of the blade, which may be formed of a suitably resistant synthetic rubber or closely-spaced nylon bristles, for example.

The liquid overflowing the annular weir 19 is substantially completely free of the soap and flotatable acid present in the feed liquid, but essentially none of the emulsified acid is removed by the flotation treatment. To convert the emulsified acid to soap in which form the acid is readily removed by a flotation procedure as described, the liquid effluent collected in chamber 17 is passed by gravity via line 34, controlled by valve 35, into a first agitator 36 in which the agitating means, shown as a motor-powered stirrer or impeller 37, are adapted to violently agitate the liquid. The violent agitation induces reaction between the emulsified acid and the magnesium salts in the sea water. To agglomerate the resulting soap particles, thereby to facilitate their removal by flotation, the effluent of the first agitator is passed by gravity via line 38 into a second agitator 39, of relatively greater volumetric capacity than the first, wherein the paddles 40 driven by motor 41 through reduction gears 42, revolve at a much slower rate than the stirrer in the first agitator.

Agitator 39 connects via line 43, with the inner tank 13' of a second flotation vessel 12', shown as identical with unit 12 except in point of height and the placement of the pump 22' and the trough 32'. Both of the flotation units have a greater volumetric capacity than the larger agitator. The flow through line 43, as in the case of the flow between the other units, is by gravity, the liquid being maintained at a higher level in unit 39 than in the flotation vessel.

The soap discharged at 33' may be separately treated, as by acid-washing to recover the acid, or it may be combined with the skimmings from the first flotation vessel and the whole subjected to such processing. This step forms no part of my invention. The liquid effluent leaving the system via line 18' is, in most instances, substantially free of turbidity. In one typical case involving a feed liquid containing fatty acid in all of the forms indicated herein, I consistently reduce the undissolved fatty acid content from an initial 8700 parts per million to less than 80 parts per million.

The foregoing description assumes that the liquid being treated contains fatty acid soap and flotatable fatty acid in addition to emulsified fatty acid. Where all or the major portion of the fatty acid is present in emulsified form the first flotation unit may be blocked out by closing valves 11a and 35 and the liquid passed directly into the first agitator 36. Should the water component of the liquid, in any case, be devoid of mineral salts capable of reacting with the emulsified acid to form soap, or if such salts are present in only small amounts, there is introduced into the liquid, through line 44, the proper quantity of a solution or slurry of a soap-forming chemical, usually lime, as previously stated. On the other hand, if the mineral salt content of the water is substantial, but less than required to convert all of the contained acid to soap, the additional soap-forming chemical required may be added downstream of the first agitator, e. g. through line 45. If desired, the valves in line 44 and 45 may be controlled automatically by known means sensitive to changes in hydrogen ion concentration.

It is understood that the invention in its apparatus aspects will not be considered as restricted to the precise details of construction indicated in the drawing, since various changes and modifications may obviously be made without departing from the scope of the invention or sacrificing the advantages derived from its use.

I claim:

1. Method of treating water containing emulsified fatty acid and a compound reactable with the fatty acid to form an insoluble soap, which comprises agitating the water to induce reaction of the acid with said compound, effecting agglomeration of the resulting soap particles by subjecting the liquid mass to relatively gentle agitation, introducing minute gas bubbles into the mass to elevate the agglomerated soap particles to the surface of the mass and removing the elevated particles from the surface, said gas bubbles being introduced in company with liquid and in a manner precluding substantial disturbance of said surface.

2. Method of treating a hard water containing emulsified fatty acid which comprises agitating the water to induce reaction of the acid with salts present in the water, effecting agglomeration of the resulting soap particles by subjecting the liquid mass to relatively gentle agitation, introducing minute gas bubbles into the mass to elevate the agglomerated soap particles to the surface of the mass and removing the elevated particles from the surface, said gas bubbles being introduced in company with liquid and in a manner precluding substantial disturbance of said surface.

3. Method of treating water containing emulsified fatty acid and also containing as a natural component a metal salt capable of reacting with the acid to give an insoluble soap, said salt being present in an amount insufficient to convert all of the acid to the insoluble soap, which comprises agitating the water to induce reaction of the acid with said salt, effecting agglomeration of the resulting soap particles by subjecting the liquid mass to relatively gentle agitation in the presence of added soap-forming chemical supplied in an amount sufficient to convert substantially all of the unreacted acid to soap, introducing minute gas bubbles into the mass to elevate the agglomerated soap particles and entrained unagglomerated soap to the surface of the mass and removing the elevated particles from the surface, said gas bubbles being introduced in company with liquid and in a manner precluding substantial disturbance of said surface.

4. A method according to claim 3 where calcium hydroxide is employed as the added soap-forming chemical.

5. Method of treating a mixture of distilled water and an emulsified fatty acid convertible to an insoluble soap which comprises agitating the mixture in the presence of added soap-forming chemical for a period of time sufficient to convert the acid to the insoluble soap, effecting agglomeration of the soap particles by subjecting the liquid mass to relatively gentle agitation, introducing minute gas bubbles into the mass to elevate the agglomerated soap particles to the surface of the mass and removing the elevated particles from the surface, said gas bubbles being introduced in company with liquid and in a manner precluding substantial disturbance of said surface.

6. A method according to claim 5 where calcium hydroxide is employed as the added soap-forming chemical.

7. Method of treating a mixture of water, fatty acid soap, and emulsified fatty acid convertible to insoluble soap which comprises separating a major portion of the soap from the mixture by a flotation procedure in accordance with which the soap particles are elevated to the surface of the mixture by minute gas bubbles charged to the mixture in a manner precluding substantial disturbance of said surface and the elevated particles are continuously removed from the surface, agitating the liquid mass to induce conversion of the emulsified acid to insoluble soap by reaction with a soap-forming chemical, effecting agglomeration of the soap particles by subjecting the mass to relatively gentle agitation and separating the agglomerated soap particles by a flotation procedure as just defined.

8. Method of treating a mixture of hard water, insoluble fatty acid soap, and emulsified fatty acid convertible to insoluble soap, which comprises separating a major portion of the soap from the mixture by a flotation procedure in accordance with which the soap particles are elevated to the surface of the mixture by minute gas bubbles charged to the mixture in a manner precluding substantial disturbance of said surface and the elevated particles are continuously removed from the surface, agitating the liquid mass to induce reaction of the emulsified acid with salts present in the water, effecting agglomeration of the resulting soap particles by subjecting the mass to relatively gentle agitation and separating the agglomerated soap particles by a flotation procedure as just defined.

9. Method of treating a mixture of water, insoluble fatty acid soap and emulsified fatty acid convertible to insoluble soap, the mixture also including as a natural component of the water a metal salt capable of reacting with the emulsified acid to give insoluble soap, said salt being present in an amount insufficient to convert all of the acid to insoluble soap, which comprises separating a major portion of the soap from the mixture by a flotation procedure in accordance with which the soap particles are elevated to the surface of the mixture by minute gas bubbles charged to the mixture in a manner precluding substantial disturbance of said surface and the elevated particles are continuously removed from the surface, agitating the water to induce reaction of the emulsified acid with said salt, effecting agglomeration of the resulting soap particles by subjecting the liquid mass to relatively gentle agitation in the presence of added soap-forming chemical supplied in an amount sufficient to convert substantially all of the unreacted acid to soap, and separating the soap by a flotation procedure as just defined.

10. Method of treating an emulsified mixture of fatty acids and distilled water which comprises adding to the mixture a compound capable of partially splitting the emulsion, separating the acid thus freed by a flotation procedure in accordance with which the acid is elevated to the surface of the mixture by minute gas bubbles charged to the mixture in a manner precluding substantial disturbance of said surface and the elevated acid is continuously removed from the surface, agitating the liquid mass in the presence of added soap-forming chemical for a period of time sufficient to convert the remaining emulsified acid to insoluble soap, effecting agglomeration of the soap particles by subjecting the mass to relatively gentle agitation, and separating the agglomerated soap particles by a flotation procedure as just defined.

11. Method of treating a mixture of water, flotatable fatty acid and emulsified fatty acid which comprises separating a major portion of the flotatable acid by a flotation procedure in accordance with which the acid is elevated to the surface of the mixture by means of minute gas bubbles and is continuously removed from the surface, said gas bubbles in said procedure being introduced in company with liquid and in a manner precluding substantial disturbance of said surface, agitating the liquid mass to induce conversion of the emulsified acid to insoluble soap by reaction with a soap-forming chemical, effecting agglomeration of the soap particles by subjecting the mass to relatively gentle agitation and separating the agglomerated soap particles by a flotation procedure as just defined.

12. Method of treating a mixture of hard water, flotatable fatty acid and emulsified fatty acid which comprises separating a major portion of the flotatable acid by a flotation procedure in accordance with which the acid is elevated to the surface of the mixture by means of minute gas bubbles and is continuously removed from the surface, said gas bubbles in said procedure being introduced in company with liquid and in a manner precluding substantial disturbance of said surface, agitating the liquid mass to induce reaction of the emulsified acid with salts present in the water, effecting agglomeration of the resulting soap particles by subjecting the mass to relatively gentle agitation and separating the agglomerated soap particles by a flotation procedure as just defined.

13. Method of treating a mixture of water, flotatable fatty acid and emulsified fatty acid, the mixture also including as a natural component of the water a metal salt capable of reacting with the emulsified acid to give insoluble soap, said salt being present in an amount insufficient to convert all of the emulsified acid to insoluble soap, which comprises separating a major portion of the flotatable acid from the mixture by a flotation procedure in accordance with which the acid is elevated to the surface of the mixture by means of minute gas bubbles and is continuously removed from the surface, said gas bubbles in said procedure being introduced in company with liquid and in a manner precluding substantial disturbance of said surface, agitating the water to induce reaction of the emulsified acid with said salt, effecting agglomeration of the resulting soap particles by subjecting the liquid mass to relatively gentle agitation in the presence of added soap-forming chemical supplied in an amount sufficient to convert substantially all of the unreacted acid to soap, and separating the soap by a flotation procedure as just defined.

14. In apparatus adapted for use in the recovery of fatty acid values from aqueous liquids containing such values, the combination with a first vessel provided with means enabling relatively violent agitation of the liquid, of a second vessel linked to the first vessel through conduit means and comprising means for moderately agitating the liquid, and a flotation unit communicating with said second vessel in which the liquid is charged with minute gas bubbles and the contained solids are separated from the liquid as a surface scum, said unit being characterized in operation in that the said gas bubbles are introduced thereinto in company with liquid and in a manner precluding substantial disturbance of the surface of the solids-containing liquid.

15. In apparatus adapted for use in the recovery of fatty acid values from aqueous liquids containing such values, the combination with a first vessel provided with means enabling relatively violent agitation of the liquid, of a second vessel linked to said first vessel through conduit means and having a greater volumetric capacity than said first vessel, said second vessel being equipped with means for moderately agitating the liquid, and a flotation unit of greater volumetric capacity than said second vessel in which liquid received from said second vessel is charged with minute gas bubbles and the contained solids are separated as a surface scum, said unit being characterized in operation in that the said gas bubbles are introduced thereinto in company with liquid and in a manner precluding substantial disturbance of the surface of the solids-containing liquid.

16. In apparatus adapted for use in the recovery of fatty acid values from aqueous liquids containing such values, the combination with a first vessel provided with means enabling relatively violent agitation of the liquid, of a second vessel comprising means for moderately agitating the liquid, said second vessel being linked to said first vessel through conduit means and having a greater volumetric capacity than said first vessel, the liquid flow thereinto being by force of gravity, and a flotation unit in which liquid from said second vessel is received by gravity flow and is charged with minute gas bubbles serving to elevate the contained solids for separation as a surface scum, said unit having a greater volumetric capacity than said second vessel and being characterized in operation in that the said gas bubbles are introduced thereinto in company with liquid and in a manner precluding substantial disturbance of the surface of the solids-containing liquid.

17. In apparatus adapted for use in the recovery of fatty acid values from aqueous liquids containing such values, the combination with a first flotation unit in which the liquid is charged with minute gas bubbles and contained insolubles are separated from the liquid as a surface scum, of a first agitator and a second agitator through which partially clarified liquid from said flotation unit is sequentially passed, and a second flotation unit communicating with said second agitator in which the liquid from said second agitator is treated in the manner of the liquid charged to said first flotation vessel, said agitators being interconnected by conduit means and being adapted respectively to violently agitate the partially clarified liquid and to moderately agitate the partially clarified liquid, said flotation units being characterized in operation in that the said gas bubbles are introduced thereinto in company with liquid and in a manner precluding the creation of substantial surface disturbances.

18. Apparatus as defined by claim 17 further characterized in that the liquid flow therethrough is by force of gravity and in that the volumetric capacity of the second agitator exceeds that of the first agitator.

FRED S. GIBBS.

References Cited in the file of this patent

FOREIGN PATENTS

| Number | Country | Date |
|---|---|---|
| 1,667 | Great Britain | May 5, 1875 |
| 14,957 | Great Britain | Sept. 4, 1886 |
| 17,230 | Great Britain | July 8, 1893 |
| 157,490 | Great Britain | Jan. 27, 1921 |